United States Patent Office 3,459,054
Patented Aug. 5, 1969

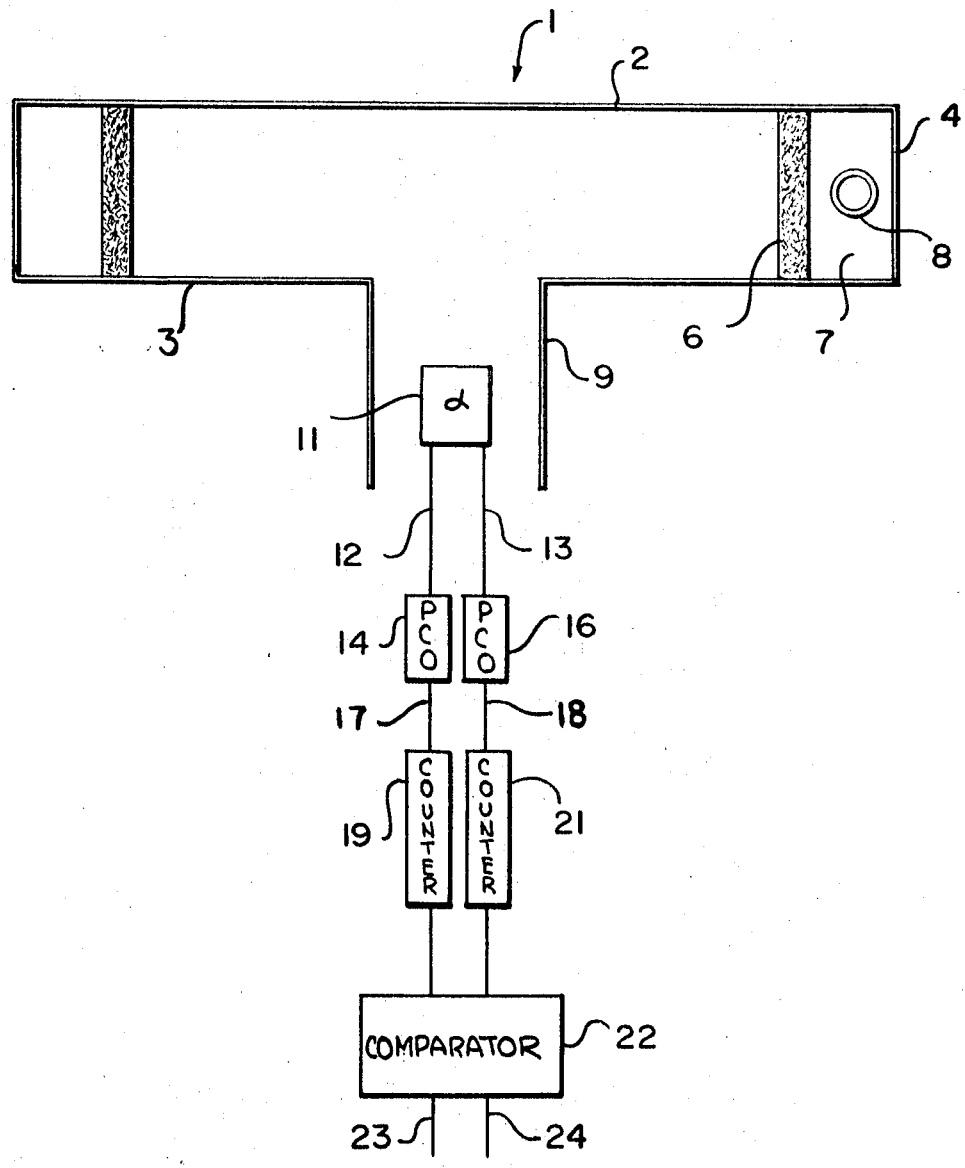

3,459,054
VORTEX READOUT SYSTEM
Edwin M. Dexter, Silver Spring, Md., assignor to Bowles Engineering Corporation, Silver Spring, Md., a corporation of Maryland
Filed Oct. 22, 1965, Ser. No. 500,977
Int. Cl. G01p *15/00;* F15c *1/14*
U.S. Cl. 73—505                                    11 Claims

ABSTRACT OF THE DISCLOSURE

A rate of turn sensor for a vortex device which employes an angle of attack meter disposed to detect rotational flow in the egress orifice of the vortex chamber and produce two analog fluid pressure signals which vary differentially as a function of the rate and direction of rotation of fluid in the egress passage. A pair of pressure controlled oscillators are responsive to the pressure signals to produce respective pulse trains having frequencies which vary as a function of the analog signals. The pulse trains are counted by respective fluid counters, the difference in counts of the two counters being sensed as an integrated function of the rotational rate of fluid in the vortex device egress orifice.

---

The present invention relates to position sensing systems and, more particularly, to a position sensing system utilizing a vortex rate of turn sensor. The present invention is related to the invention disclosed in my co-pending U.S. patent application Ser. No. 430,697.

It is known that a vortex device, when suitably coupled to an object, produces an output signal proportional to the rate of turn of the object about one of its axes. It is also known from the basic principles of physics that the integral of a rate signal is proportional to the position of that apparatus, and as applied to the present application, the integral of a rate of turn signal is proportional to the rotational position of the device relative to an initial position.

Certain difficulties are encountered in a pure fluid system when one attempts to integrate the rate of turn signal derived from a vortex amplifier to provide a position signal, particularly where the integrating interval is long. The conventional method for integrating an analog signal in a pure fluid system is to supply the signal to a tank so that the pressure in the tank becomes a function of the total quantity of fluid supplied thereto. Such a device, however, has two inherent difficulties. The first of these difficulties relates to the fact that, if a signal is applied thereto for a relatively long time, the pressure in the tank approaches the pressure of the input signal and no further fluid can be supplied to the tank. Thus, although the signal may continue for an additional extended period, the tank is charged to the pressure of the signal and all subsequent information is lost. This problem can be overcome by employing a tank which is sufficiently large that the anticipated duration of signals will not charge the tank to the pressure of the input signal.

A second problem encountered in the use of a tank as an integrating device is the loss of position information previously accumulated. If, as has been assumed herein, the apparatus is a wholly pure fluid apparatus, then the device for sensing pressure in the tank must accept fluid from the tank. To the extent that the sensing apparatus accepts fluid from the tank, the tank is discharged and a loss of memory results. For example, suppose that a tank is charged for a predetermined interval after which rotation of the apparatus being sensed is discontinued. The tank should retain information relative to the prior rotation until a counter-rotation is developed which reorients the device to its original position. However, due to the bleed of fluid from the tank, the tank pressure may return to ambient pressure before the apparatus is reoriented, resulting in the loss of the position information. Again, the time interval over which a tank may retain position information is a function of the size of the tank relative to the rate of extraction of fluid from the tank. If a sufficiently large tank is employed, both of the problems set forth above may be overcome. However, it is found that, where position information must be accumulated and retained for as little as several minutes, the size of the tank becomes impractical for many applications.

It was contemplated that many of the difficulties encountered in employing analog integrators could be overcome by employing a digital system. However, a number of problems arise when one attempts to convert analog signals available from the vortex readout device to digital signals. Specifically, in a vortex readout device, there is a continuous flow through the egress passage regardless of the condition of rotation of fluid in the vortex chamber. When there is no rotation, fluid flows linearly or axially in the passage whereas, when there is rotation, the fluid therein is composed of a linear flow with a superposed rotational flow. Thus, regardless of whether the device is rotating or not, there is fluid flow in the egress passage and there are no ready means available for eliminating the effects of linear flow.

In an electrical system, series blocking capacitors can be employed for removing D.C. levels so that one sees only changes in the signal level. In pure fluid systems, the fluid equivalent of a blocking capacitor is not available and thus the apparatus cannot or does not have available a zero signal level deviation from which may be readily detected. Thus, any conversion system for converting the analog signals to digital signals must eliminate the effects of continuous flow in the system while retaining any information relating to rotation of the fluid.

A further difficulty in utilizing digital techniques in fluid systems is the fact that the apparatus normally employed does not readily accept negative signals. Thus, the system must be such as to be able to detect relative differences in levels as between signals as an indication of plus or minus functions, in this case clockwise or counterclockwise rotation.

In accordance with the present invention, a digital integrating system for use with a vortex readout device is provided, which system can readily differentiate between clockwise and counterclockwise rotation and which can readily eliminate the effects of a constant flow of fluid from the vortex unit. The apparatus for detecting rotational flow in the egress orifice of the vortex chamber may be a symmetrical angle-of-attack meter which produces two output signals. When wholly linear flow is detected in the egrees passage indicating radial, i.e. non-rotational, flow in the chamber the two output signals are of equal ampltude. If rotation is induced in the fluid of the vortex chamber, the angle of attack of the fluid varies as a function of the rate of rotation and the two output signals vary differentially relative to the linear flow condition. Specifically, the flow and pressure of one of the signals increases and the other decreases, the particular signals increasing and decreasing being a function of the direction of angle-of-attack, i.e. rotational flow.

The effects of continuous flow are eliminated, according to the present invention, by employing two pressure-controlled oscillators which produce equal output frequencies upon the application of equal pressures of flow thereto. When linear flow is detected through the egress orifice of the vortex chamber, equal pressure flows are applied to both pressure-controlled oscillators and there is no difference frequency between the oscillators. On the other hand, if rotational flow is induced in the vortex chamber, the pressures of the signals applied to the oscillators vary differentially. The frequency of the oscillator receiving the higher pressure signal increases and the frequency of the oscillator receiving the lower pressure signal decreases. By employing an apparatus which can produce an indication of the long-term difference of frequencies of the oscillators, the effects of continuous flow of fluid in the egress orifice are eliminated, the apparatus is responsive only to those components of flow related to rotation of fluid in the vortex chamber, and a curse deviation signal is produced.

In order to retain the position information, each of the pressure controlled oscillators, for instance, drives a separate counter. The count at any given time in each counter is a function of the total history of the number of pulses of fluid applied to the counter. The difference between the counters is a function at any time of the total history of all pulses applied to both counters. This information is retained for an indefinite period thereafter. More particularly, if a rate of rotation of the device has produced a difference in count between the two counters of, for instance, ten, the fact that for an extended period thereafter the frequencies of both pressure-controlled oscillators are equal does not in any way affect the achieved differential in count since both counters will step in unison during this latter period. Only when the apparatus has been rotated in a direction counter to the original direction of rotation does the difference in frequencies of the counters tend to reduce and, when the apparatus has rotated back to its original position or heading, achieve zero.

It is therefore an object of the present invention to provide a digital readout system for vortex amplifiers which system is insensitive to continuous flow of fluid through the egress orifice of the vortex amplifier.

It is another object of the present inveniton to develop two analog signals which vary in sense and amplitude as a function of the direction and rate of rotation of fluid in the vortex amplifier, to produce digital pulse trains having frequencies which vary as a function of the aforesaid differentially related analog signals and thereafter produce a further analog signal indicative of position of rotation relative to an initial position.

It is another object of the present invention to employ an angle-of-attack sensor for producing two differentially related analog fluid signals which are applied to substantially identical pressure controlled oscillators to produce pulse trains having pulse repetition rates differentially related as a function of the rate of rotation of the fluid in a vortex rate-of-turn sensor.

The above and still further objects, features and advantages of the present invention will become apparent upon consideration of the following detailed description of one specific embodiment thereof, especially when taken in conjunction with the accompanying drawing, wherein the single figure of the accompanying drawing is a schematic block diagram of the apparatus of the present invention.

Referring specifically to the single figure of the accompanying drawing, there is provided a vortex device generally designated by the reference numeral 1. The device includes a top circular plate or disc 2 and a bottom circular plate or disc 3 interconnected by an annular outer wall 4. Located internally of the outer wall 4 and parallel thereto is an annular wall 6 pervious to fluid flow. The outer wall 4 and inner wall 6 define an annular chamber 7 into which fluid is introduced by means of a passage or pipe 8. The fluid in the region 7 flows through the wall 6 toward an egress passage 9 formed along the axis of the device in the wall 3. The diameter of the egress passage 9 is small relative to the inner diameter of the wall 6 so as to provide a large vortex amplification in accordance with generally established principles.

If the vortex device 1 is not rotating, the fluid flow through wall 6 proceeds along radial paths to the egress passage 9 and flows linearly therethrough. If, however, the vortex chamber 1 is rotated, the fluid passing through the wall 6 at this time obtains a tangential velocity component relative to the fluid in the chamber and thus induces rotation at the periphery of the device. This rotation proceeds along a spiral path to the egress passage 9 and exits therethrough. Under these circumstances, the fluid in the egress passage 9 has a helical spiral determined by the linear flow rate of the fluid through the passage relative to the rotational velocity induced in the vortex device. This rotational velocity and direction is a function of the rate and direction of rotation of the vortex device and thus, the helical spiral becomes a function of this rate and direction of rotation.

Located in the egress passage 9 is an angle-of-attack meter 11 which produces in output passages 12 and 13, fluid signals related to the pattern of the flow through the passage 9. If the flow through the passage 9 is wholly linear, the pressures and flows through the passages 12 and 13 may be, for instance, equal. If, however, the fluid has a component of rotational flow, the pressure in one of the passages, such as 12, increases and the pressure in the passage 13 decreases. If the flow is in the opposite direction, then the pressure and flow rates in the passage 13 increase and the pressure and flow rates in the passage 12 decrease. The passages 12 and 13 are connected each to a different pressure-controlled oscillators 14 and 16, respectively. These devices produce fluid pulses in passages 17 and 18, respectively, which may be linear functions of the pressure of the fluid in the passages 12 and 13, respectively. Thus, if the pressures of the fluid flowing in the passages 12 and 13 are equal, the frequencies of the fluid pulses in the passages 17 and 18 are equal. On the other hand, if the passage 12 has developed therein a higher pressure flow than in passage 13, the frequency of fluid pulses in the line 17 is higher than the passage 18. The converse is also true.

An important fact evolves from the use of the two pressure-controlled oscillators. Since the frequencies of the pulses produced by the two oscillators are the same when the pressures in the passages 12 and 13 are the same, the system has effectively eliminated the D.C. signal component; that is, the effects of the linear component of flow through the egress passage 9. Since the apparatus is intended to integrate the rate signal and thus respond only to the difference in pulse repetition rates of the two oscillators, the fluid pulses appearing in the passages 17 and 18 are applied, respectively, to counters 19 and 21. A comparator 22 is employed to determine the difference in the total count accumulated in the two counters and produce differentially related analog output signals indicative thereof.

If the vortex device 1 has not been subjected to a rotation at any time during the period since the apparatus has been put into operation, the frequencies of the two oscillators 14 and 16 have been the same at all times and the counts in the counters 19 and 21 have remained equal at all times and are still equal. The comparator, therefore, does not detect a difference in count and produces on its output leads 23 and 24 analog signals of equal magnitude. These signals, as indicated above, are related to the position of the apparatus to which the vortex device 1 is connected rather than the rate of rotation of the device as is true of the signals appearing in the passages 12 and 13.

If, at any time, the vortex device 1 is subject to rotation resulting in a consequent difference in frequency of oscillation of the oscillators 14 and 16, this difference is registered in the counters 19 and 21. As an example, suppose that the vortex device has been subject to a rotation of one-tenth of a degree per second for two minutes and, under these circumstances, the difference in frequency of the oscillators is one-tenth of a count per second. The difference of the counts in the counters 19 and 21 is now 12. If now the rotation of the apparatus is discontinued, the frequency of the oscillators 14 and 16 again becomes equal so that the counters 19 and 21 are stepped in unison. However, the fact that the oscillators are now stepped at the same rate does not disturb the prior difference of accumulated count. The comparator 22 continues to produce analog output signals on the leads 23 and 24, the difference of which is indicative of a count difference of 12. If now the apparatus to which the vortex device 1 is attached is rotated in a direction opposite to that initially assumed, at a rate again of one-tenth of a degree per second for two minutes, the counters 19 and 21 again become balanced and the comparator 22 produces equal signals in its output passages 23, 24.

The vortex rate-of-turn sensor may take many forms other than an angle-of-attack sensor, numerous pure fluid readout devices for vortex devices being known. Also, the angle-of-attack sensor may take several forms, one specific type applicable hereto being disclosed in co-pending patent application of Bowles and Windsor filed on Apr. 14, 1964 for "Lift Sensing and Measuring System," Ser. No. 359,758, now U.S. Patent No. 3,327,529, and assigned to the same assignee as the present invention. Various analog to digital pulse rate converters may also be employed. If pressure controlled oscillators are employed they may be of the type defined in co-pending application Ser. No. 500,672 filed Oct. 22, 1965 for "Pure Fluid Counting Mechanism" by William C. O'Neill III and assigned to the same assignee as the present invention.

Conventional fluid counters such as described in Warren Patent No. 3,001,698 may be employed for the counters 19 and 21. However, it is preferred, for reasons specified therein, to employ the counters forming the subject matter of the aforesaid application of O'Neill, Ser. No. 500,672. The comparator 22 may also take several forms, one form of which is disclosed in the aforesaid O'Neill application.

It has been previously stated that a symmetrical angle-of-attack meter should be employed so that, in the presence of linear flow equal signals are produced in passages 12 and 13. Under some circumstances, it may not be desired to employ a symmetrical device, in which case, signals in passages 12 and 13 are not equal in the presence of linear flow. In this situation, it is only necessary to utilize oscillators having equal frequencies at different input pressures to employ the system of the invention. Alternatively, oscillators having harmonically related frequencies at the two pressures developed in response to linear flow may be employed with a counter which divides the higher frequency down to the lower frequency. Specifically, if one oscillator operates at twice the frequency of the other under zero rate of turn conditions, an additional counter stage in the counter associated with the higher frequency oscillator provides the necessary division.

The invention has been described as employing a comparator 22 which develops differentially related analog signals on its output leads 23 and 24. It is not intended to limit the invention to a specific type of comparator, comparators developing other types of information signals being equally applicable. For instance, pulse duration modulated signals may also be developed and utilized in a course control system, also as described in the aforesaid application of William C. O'Neill III.

What I claim is:

1. A vortex system comprising a vortex rate of turn sensor having an egress passage, first means for sensing fluid flow in said egress passage and for developing a pair of differentially related analog fluid pressure signals having a magnitude and sense determined by the rate and direction of rotation of fluid in said egress passage, second means for developing two fluid pulse trains each having a frequency which varies as a function of the magnitude of a different one of said analog signals, third means for integrating each of said fluid pulse trains and means for developing an output signal which varies as a function of difference of the integrated pulse trains.

2. A vortex system comprising a vortex rate of turn sensor having an egress passage, first means for sensing fluid flow in said egress passage and for developing a pair of differentially related analog fluid pressure signals having a magnitude and sense determined by the rate and direction of rotation of fluid in said egress passage, second means for developing two fluid pulse trains each having a frequency which varies as a function of the magnitude of a different one of said analog signals, a third means for digitally integrating each of said fluid pulse trains and means for developing an output signal which varies as a function of the difference of the integrated pulse trains.

3. A vortex system comprising a vortex rate of turn sensor having an egress passage, means for producing a rate and sense of rotation of fluid in said vortex rate of turn sensor as a function of rate and sense of rotation of an object whose rotation is to be sensed, first means for sensing fluid flow in said egress passage and for developing differentially related analog fluid signals having a magnitude and sense determined by the rate and direction of rotation of fluid in said egress passage, second means for developing two fluid pulse trains each having a frequency which varies as a function of the magnitude of different one of said analog fluid signals, third means for integrating each of said pulse trains and means for developing an output signal which varies as a function of the difference of the integrated pulse trains.

4. The combination according to claim 3 wherein said first means is an angle of attack sensing device.

5. The combination according to claim 3 wherein said second means are pressure controlled oscillators producing equal pulse train frequencies in response to equal signals.

6. The combination according to claim 3 wherein said third means are pulse counters.

7. A pure fluid vortex system comprising a vortex rate of turn sensor having a fluid egress passage, an angle-of-attack sensor for sensing fluid flow in said egress passage and for producing differentially related analog fluid signals having a differential sense and magnitude determined by the sense and rate of rotation of fluid in said egress passage, fluid analog-to-pulse frequency converters for developing two fluid pulse trains each having a frequency which is a function of the magnitude of a different one of said analog signals, digital fluid means for intergrating each of said pulse trains, and means for developing an output signal which varies as a function of the difference of the integrated pulse trains.

8. A readout unit for vortex elements in which the direction and rate of rotation of fluid in an egress orifice of the vortex unit is dependent upon a function applied to the unit, said readout system comprising means for developing two fluid pressures which vary differentially as a function of rate and sense of rotation of fluid in the egress orifice of the vortex unit, two pressure control fluid oscillators each connected to receive different ones of said two fluid pressures so that each oscillator signal varies about a center frequency as a function of said respective fluid pressure, said pressure controlled oscillators having substantially the same linear frequency versus pressure characteristics over the range of pressure variations of said two fluid pressures, and means for producing a signal which is an integrated function of the sense and difference of frequencies of said oscillators.

9. A readout device for vortex rate of turn sensor comprising means for producing two fluid pressures which vary differentially over a positive range of pressures as a function of direction and rate of rotation of fluid in the vortex rate of turn sensor, two pressure controlled fluid oscillators each connected to receive different ones of said two fluid pressures so that each oscillator signal varies about a center frequency as a function of said respective fluid pressure, said pressure controlled oscillators having substantially the same linear frequency versus pressure characteristic over the range of pressure variations of said two fluid pressures, and means for producing a signal which is an integrated function of the sense and difference of frequencies of said oscillators.

10. A readout system for vortex elements in which the direction and rate of rotation of fluid in an egress orifice is dependent upon a function applied to the unit, said readout system comprising means for developing two fluid pressures which vary differentially relative to a reference pressure as a function of direction and rate of rotation of fluid in the egress orifice of the vortex element, a pair of pressure controlled oscillators having the same linear frequency-versus-pressure characteristics over the operating range of variations in pressures generated by said means for developing, each said oscillator connected to receive a different one of said fluid pressures whereby the frequencies of said oscillators vary differentially as said fluid pressures vary differentially, counter means for dividing each of said frequencies by the same predetermined factor and means for determining the sense and difference in count rate of said counting means.

11. A readout system for vortex amplifiers in which the direction of rotation of fluid in an egress orifice of the vortex amplifier is dependent upon a function applied to the amplifier, said readout system comprising:

means for developing two pressures which vary differentially as a function of direction of rotation of fluid in the egress orifice of the vortex amplifier;

two pressure controlled oscillators connected to said means such that their frequencies of oscillation vary about respective center frequencies as a function of the differentially varying fluid pressures developed by said means; and means for determining the sense of the difference in frequencies generated by said oscillators as an indication of the direction of rotation of fluid in the egress orifice of the vortex amplifier.

References Cited

UNITED STATES PATENTS

| 3,081,637 | 3/1963 | Gevas | 73—503 X |
| 3,261,209 | 7/1966 | Rae | 73—505 |
| 3,274,828 | 9/1966 | Pulvari | 73—398 X |
| 3,319,471 | 5/1967 | Hermann | 73—505 |

CHARLES A. RUEHL, Primary Examiner

U.S. Cl. X.R.

437—81